United States Patent
Conklin et al.

[11] 3,909,654
[45] Sept. 30, 1975

[54] CAMERA TUBE HAVING LENS ELEMENT FOR EACH ELEMENT OF TRI-GLYCERINE SULFATE MOSAIC

[75] Inventors: Thomas H. Conklin, Ridgefield, Conn.; Merton H. Crowell, Mahopac; Barry M. Singer, New York, both of N.Y.

[73] Assignee: North American Philips Corporation, New York, N.Y.

[22] Filed: Sept. 20, 1974

[21] Appl. No.: 507,712

[52] U.S. Cl. ............................ 313/388; 313/371
[51] Int. Cl.² ................... H01J 29/89; H01J 39/49
[58] Field of Search .......... 313/388, 371, 380, 384, 313/385, 386, 390, 383, 367, 374, 366

[56] References Cited
UNITED STATES PATENTS

| | | | |
|---|---|---|---|
| 2,734,938 | 2/1956 | Goodale | 313/371 X |
| 2,951,175 | 8/1960 | Null | 313/388 X |

*Primary Examiner*—Robert Segal
*Attorney, Agent, or Firm*—Frank R. Trifari; Carl P. Steinhauser

[57] ABSTRACT

A camera tube employs a pyroelectric target composed of a plurality of isolated orthorhombic pieces of pyroelectric material. Incoming radiation is focussed on the pieces of pyroelectric material by a plurality of lenses which constitute a fly's eye lens.

2 Claims, 2 Drawing Figures

CAMERA TUBE HAVING LENS ELEMENT FOR EACH ELEMENT OF TRI-GLYCERINE SULFATE MOSAIC

The Government has rights in this invention pursuant to Contract No. DAAK02-73-C-0335 awarded by the Department of the Army.

The invention relates to a camera tube employing a pyroelectric target and in particular to a target composed of a multitude of isolated orthorhombic pieces for reducing lateral heat flow.

It has been found that lateral heat flow in a pyroelectric target results in a degradation of spatial resolution. While lateral heat flow in such a target may be reduced by dividing the target into a number of small pieces, this introduces a substantial kerf loss. As a result, radiation that strikes the areas between the pieces will not be absorbed and hence will not contribute to the pyroelectric signal.

A principal object of the invention is to eliminate this loss in signal in a camera tube with a pyroelectric target.

A further object of the invention is to produce a larger pyroelectric signal for the same amount of radiation incident on a pyroelectric target.

These and further objects of the invention will appear as the specification progresses.

In accordance with the invention, in order to reduce, or eliminate lateral heat-flow in a pyroelectric target, the target is divided into a multiplicity of small, isolated orthorhombic pieces. In order to reduce kerf loss, an array of tiny lenses, known as a fly's eye lens, is placed in front of the target. Each individual lens focuses a portion of the radiation onto one of the small orthorhombic pieces of pyroelectric material.

The signal produced from a pyroelectric material is indirectly proportional to the volume of the orthorhombic piece of material and directly proportional to the radiation absorbed. This stated mathematically as:

$$I_s = \frac{p \cdot A \Delta w}{V c \rho} \quad (1)$$

where
$p$ = pyroelectric efficiency in coulombs/cm$^2$°C
$V$ = volume of pyroelectric material in cm$^3$
$A$ = surface area of pyroelectric material in cm$^2$
$c$ = specific heat in Joules/gm.°C
$\rho$ = density in gm/cm$^3$
$\Delta \omega$ = power into material in watts.

The amount of radiation focused into the material by each lens is the amount incident on the lens of area $\pi a^2/4$. This radiation is then absorbed by the pyroelectric material with an area equal to xy. Assuming the intensity of the incident radiation is uniform over the small area, then the amplification of the signal would be given by the ratio of these areas, i.e., $$\text{amplification} = \frac{\frac{\pi a^2}{4}}{xy} = \frac{\pi a^2}{4xy} \quad (2)$$

The invention will be described in greater detail with reference to the accompanying drawing in which.

Figure 1:
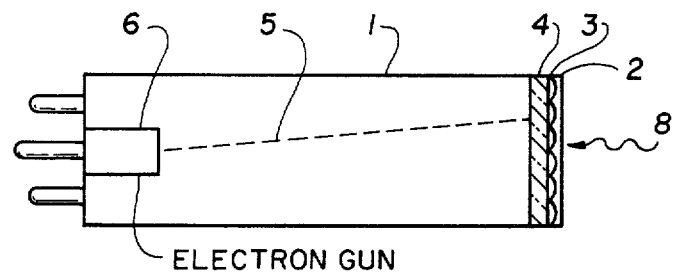
FIG. 1 is a diagrammatic view of a camera tube employing a pyroelectric target.

The camera tube shown in FIG. 1 comprises an evacuated envelope having a transparent end wall 2 on which a transparent electrically conductive layer 3 is provided which is in contact with a pyroelectric target 4 of tri-glycerine sulfate (TGS). The target is scanned by an electron beam 5 produced by an electron beam 5 produced by an electron gun at the other end of the envelope. Means for deflecting the electron beam to scan the target are provided but are not shown for reasons of simplicity.

Figure 2:
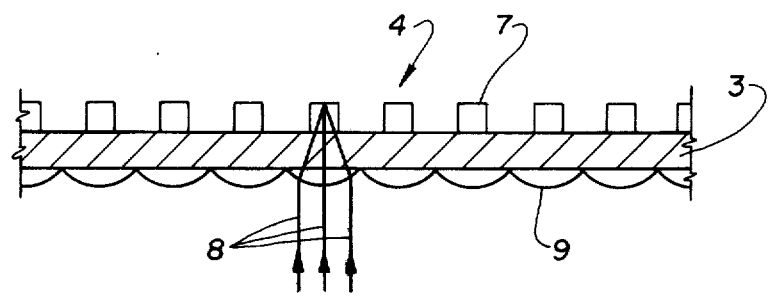
FIG. 2 shows the target in greater detail.

As shown in FIG. 2 the pyroelectric target 4 is divided into a multiplicity of orthorhombic pieces 7 which are separate, and isolated from each other. Incoming thermal radiation from an object (not shown) produces a thermal image in the target which produces a potential image which is scanned by the electron beam.

In order to focus the incoming radiation on the target, as shown in FIG. 2, a multiplicity of tiny lenses 9 are placed in the path of the incoming radiation and together constitute a fly's eye lens. Each of these tiny lenses focuses a portion of the incoming radiation on one of the orthorhombic pieces of the target material, thereby minimizing the loss of radiation in areas not covered by target material, i.e. between the pieces of the target.

What is claimed is:

1. A camera tube comprising an evacuated envelope having a window at one end thereof, means for generating an electron beam within said envelope, a pyroelectric target of tri-glycerine sulfate in proximity to said window for receiving a thermal image and converting said thermal into a potential image which is scanned by said electron beam, said target further comprising a multiplicity of isolated portions of said material to minimize lateral heat flow therein, and means for concentrating said thermal image on the target portions, said latter means comprising a plurality of lens positioned to focus a portion of the thermal image onto each isolated portion of said target.

2. A camera tube as claimed in claim 1 in which each target portion is orthorhombic.

* * * * *

UNITED STATES PATENT AND TRADEMARK OFFICE
CERTIFICATE OF CORRECTION

PATENT NO. : 3,909,654
DATED : September 30, 1975
INVENTOR(S) : THOMAS H. CONKLIN: MERTON H. CROWELL: BARRY M. SINGER It is certified that error appears in the above-identified patent and that said Letters Patent are hereby corrected as shown below:

In the title: Change "TRI-GLYCERING" to read --TRI-GLYCINE--;

Col. 2, line 17, change "tri-glycerine" to read --tri-glycine--

In the Claim 1, line 4, change "tri-glycerine" to read --tri-glycine--;

Signed and Sealed this

First Day of November 1977

[SEAL]

Attest:

RUTH C. MASON
Attesting Officer

LUTRELLE F. PARKER
Acting Commissioner of Patents and Trademarks